United States Patent [19]

Murayama

[11] Patent Number: 5,091,976
[45] Date of Patent: Feb. 25, 1992

[54] IMAGE CODING METHOD FOR EXTRACTING, SEGMENTING, AND CODING IMAGE CONTOURS

[75] Inventor: Noboru Murayama, Machida, Japan
[73] Assignee: Ricoh Company, Ltd., Japan
[21] Appl. No.: 480,065
[22] Filed: Feb. 14, 1990

[30] Foreign Application Priority Data

Feb. 22, 1989 [JP] Japan .................................. 1-42842

[51] Int. Cl.$^5$ .......................... G06K 9/36; G06K 9/48; G06K 9/46; H04N 1/415
[52] U.S. Cl. ........................................ 382/56; 382/21; 382/22; 358/261.3
[58] Field of Search ............................ 382/21, 22, 56; 358/261.3, 133

[56] References Cited

U.S. PATENT DOCUMENTS

| | | | |
|---|---|---|---|
| 4,675,831 | 6/1987 | Ito et al. ............................... | 364/518 |
| 4,688,182 | 8/1987 | Schrieber ............................. | 364/523 |
| 4,698,691 | 10/1987 | Suzuki et al. ....................... | 358/283 |
| 4,698,778 | 10/1987 | Ito et al. ............................... | 364/518 |
| 4,771,474 | 9/1988 | Takashima et al. ................... | 382/56 |
| 4,797,943 | 1/1989 | Murayama et al. .................. | 382/54 |

FOREIGN PATENT DOCUMENTS

| | | |
|---|---|---|
| 0175179 | 3/1986 | European Pat. Off. . |
| 0191134 | 8/1986 | European Pat. Off. . |
| WO83/02179 | 6/1983 | PCT Int'l Appl. . |
| 2147474 | 5/1988 | United Kingdom . |
| 2203613 | 10/1988 | United Kingdom . |

Primary Examiner—David K. Moore
Assistant Examiner—Michael R. Cammarata
Attorney, Agent, or Firm—Mason, Fenwick & Lawrence

[57] ABSTRACT

An image coding method extracts a contour of a bi-level image, segments the contour into a plurality of segments by fitting a predetermined generation curve on each of the segments, where the predetermined generation curve is described by control points which include end control points and direction control points, the end control points indicate ends of each segment and the direction control points indicate directions of each segment at the two ends of each segment, and codes the control points.

8 Claims, 9 Drawing Sheets

FIG.6A
FIG.6B
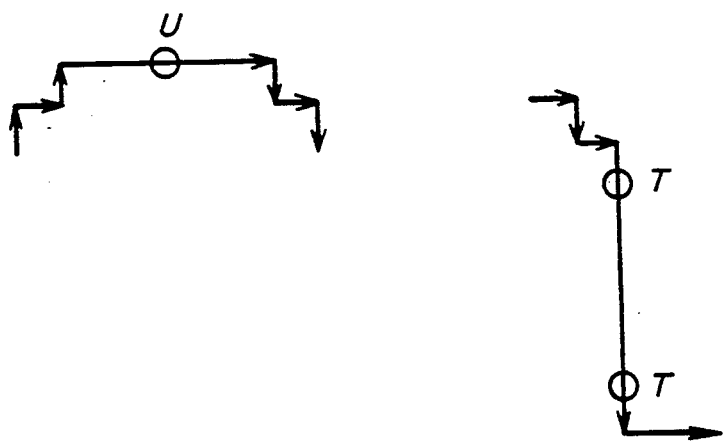
FIG.7
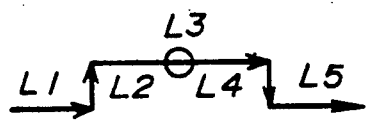
FIG.8
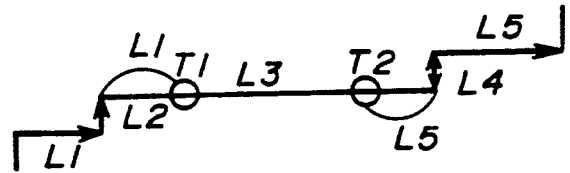

IMAGE CODING METHOD FOR EXTRACTING, SEGMENTING, AND CODING IMAGE CONTOURS

BACKGROUND OF THE INVENTION

The present invention generally relates to image coding methods, and more particularly to an image coding method which codes a black-and-white bi-level image when making an image processing, an image communication and the like.

Generally, a bi-level image can be coded depending on a contour information thereof. However, according to the conventional image coding method, a contour of an original image is first extracted and the contour is then coded as it is. As a result, there is a problem in that the picture quality deteriorates when the original image is subjected to an image processing such as enlarging, reducing and rotating processes. In addition, there is a problem in that the quantity of the coded information cannot be reduced.

SUMMARY OF THE INVENTION

Accordingly, it is a general object of the present invention to provide a novel and useful image coding method in which the problems described above are eliminated.

Another and more specific object of the present invention is to provide a image coding method comprising the steps of extracting a contour of a bi-level image, segmenting the contour into a plurality of segments by fitting a predetermined generation curve on each of the segments, where the predetermined generation curve is described by control points which include end control points and direction control points, the end control points indicate ends of each segment and the direction control points indicate directions of each segment at the two ends of each segment, and coding the control points. According to the image coding method of the present invention, it is possible to realize a coding which requires only a relatively small code information quantity and has a high coding efficiency. The image data which is coded by the image coding method of the present invention is suited for being subjected to an affine transformation such as enlarging, reducing and rotating processes.

Other objects and further features of the present invention will be apparent from the following detailed description when read in conjunction with the accompanying drawings.

BRIEF DESCRIPTION OF THE DRAWINGS

FIGS. 6A, 6B, 7 and 8 respectively are diagrams for explaining a segmentation of the contour;

DESCRIPTION OF THE PREFERRED EMBODIMENTS

Figure 1:
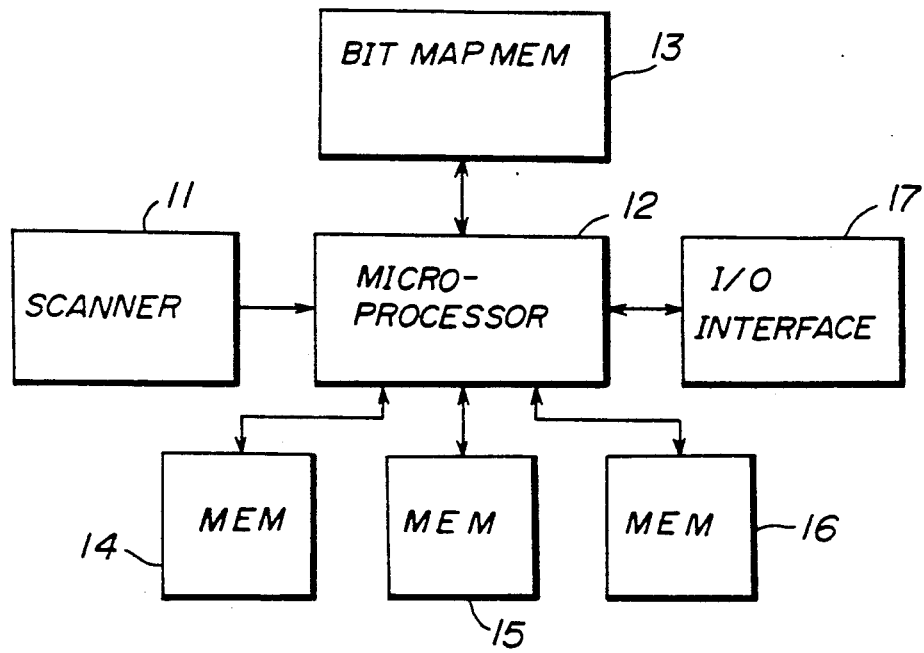
FIG. 1 is a system block diagram showing an image processing system to which an image coding method according to the present invention may be applied.

FIG. 1 shows an image processing system to which an image coding method according to the present invention may be applied. In FIG. 1, a scanner 11 reads an original image from a document (not shown), and output image data of the scanner 11 are stored in a bit map memory 13 via a microprocessor 12. The microprocessor 12 extracts a contour of the original image from the image data stored in the bit map memory 13 and automatically traces the extracted contour. Traced data which are obtained by tracing the contour are stored in a contour data memory 14.

Next, the microprocessor 12 analyzes the contents of the contour data memory 14 and segments the contour into a plurality of curve or straight line segments. Addresses of control points (or feature points) are stored in a control point address memory 15. Finally, the microprocessor 12 codes each control point address stored in the control point address memory 15 and stores the coded data (coded control point addresses) in a code memory 16. The microprocessor 12 reads the coded data from the code memory 16 when needed and outputs the coded data via an input/output interface 17.

Figure 2:
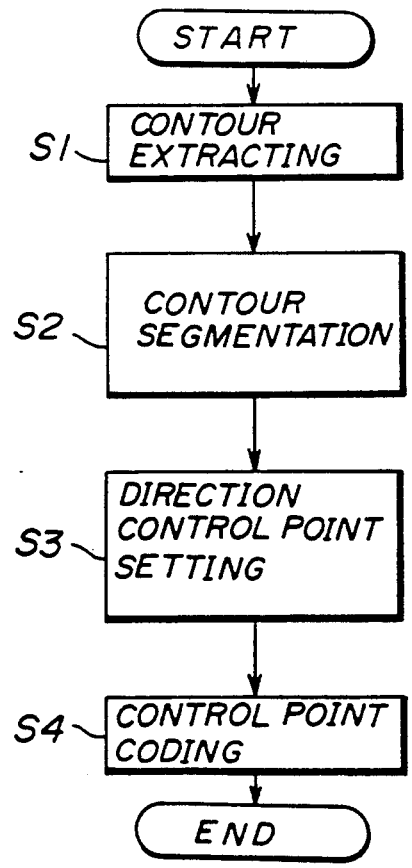
FIG. 2 is a flow chart showing an embodiment of the image coding system according to the present invention.

FIG. 2 shows an operation of the microprocessor 12 for carrying out an embodiment of the image coding method according to the present invention. For the sake of convenience, it is assumed that the original image is a character "a".

Figure 3A:
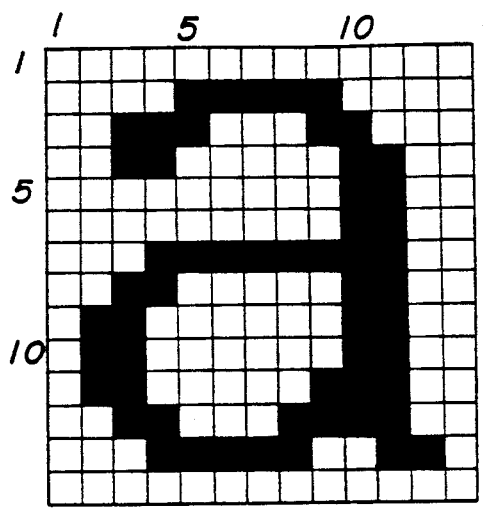
FIGS. 3A, 3B and 3C respectively show an original bi-level image of a character "a", a contour of this character, and a contour fitted with a modified Bezier curve.
Figure 3B:
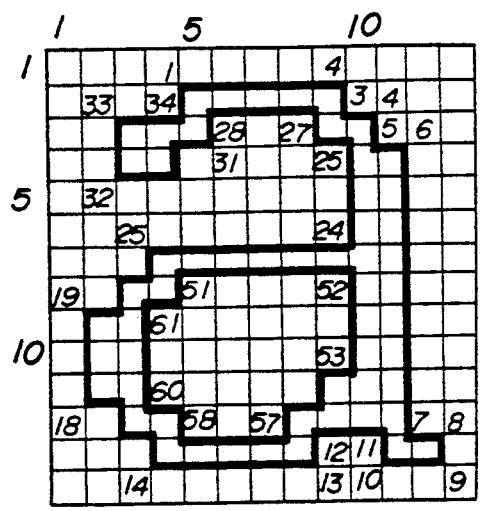

In FIG. 2, a step S1 makes a contour extracting process. Conventionally, there are various methods of extracting the contour from the original image, and this embodiment may employ any of such known methods. For example, the original image is enlarged to two times the original size. An 8-direction convolution process in which the value of an object picture element is multiplied by 8 and the values of the 8 surrounding picture elements are subtracted is repeated. The contour of the original image is obtained by selecting a position where the result of the convolution is positive. FIG. 3A shows the original bi-level image of a character "a" which is described by a 12×12 dot matrix. FIG. 3B shows the contour of this character "a", where the numbers "1" through 34" within the dot matrix indicate transition points from white to black and vice versa when the scan is made in the direction X and Y.

Figure 3C:
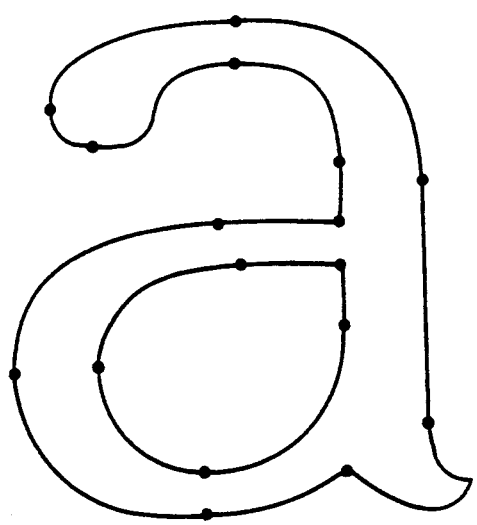

A step S2 makes a contour segmentation process (setting of points P0) by automatically tracing the contour of the original image and segmenting the contour into a plurality of curve or straight line segments. In this embodiment, the contour of the original bi-level image is segmented by fitting the third order modified Bezier curve (polynomial). FIG. 3C shows the contour of the character "a" shown in FIG. 3A when the segmentation is made by fitting the modified Bezier curve, where points on the contour shown in FIG. 3C indicate start and end points of the curve segments.

Figure 4A:
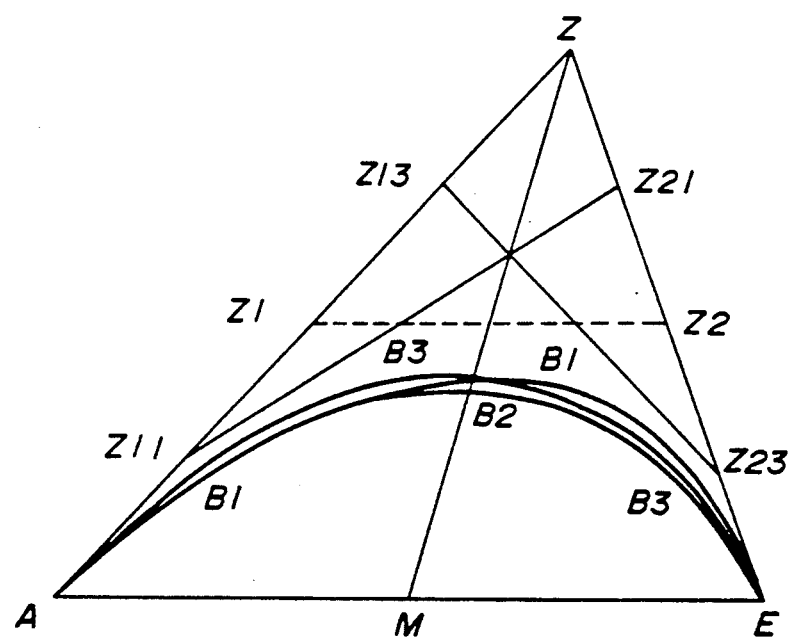
FIGS. 4A, 4B and 4C respectively are diagrams for explaining a modified Bezier curve.

A description will be given of the modified Bezier curve. It is known to use the Bezier curve to represent the contour of a character font. As shown in FIG. 4A, the Bezier curve B(t) is described by the following formula (1) using four control points A, Z1, Z2 and E.

$$B(t) = A \cdot (1-t)^3 + 3 \cdot Z1 \cdot (1-t)^2 \cdot t + 3 \cdot Z2 \cdot (1-t) \cdot t^2 + E \cdot t^3 \quad (1)$$

In the formula (1), $t = 0, \ldots 1$ and denotes a variable for obtaining X and Y coordinates of B(t). The X and Y coordinates of B(t) can be obtained by substituting the X and Y coordinates of A, Z1, Z2 and E into the formula (1). When B(t) is differentiated by t and denoted by B'(t), the following formula (2) is obtained.

$$B'(t) = -3 \cdot A \cdot (1-t)^2 + 3 \cdot Z1 \cdot (1-4 \cdot t + 3 \cdot t^2) + 3 \cdot Z2 \cdot (2 \cdot t - 3 \cdot t^2) + 3 \cdot E \cdot t^2 \quad (2)$$

It may be seen from FIG. 4A that Z1 and Z2 do not affect the shape of the curve to a large extent. The following set of formulas (3) can be obtained from the formulas (1) and (2).

$$B(0) = A$$

$$B(1) = E$$

$$B'(0) = Z1 - A$$

$$B'(1) = E - Z2 \quad (3)$$

The Bezier curve B(t) passes through the control points A and E out of the control points A, Z1, Z2 and E. But because the control points Z1 and Z2 are too far away from the generation curve, it is difficult to fit the curve to the contour of the original image as may be seen from FIG. 9 which will be described later.

Next, a description will be given of the modified Bezier curve. A straight line L which passes through arbitrary points P1 and P2 is denoted by L(P1, P2). The following formula (4) can be obtained from the formula (1).

$$B(0.5) = (A + 3 \cdot Z1 + 3 \cdot Z2 + E)/8 \quad (4)$$

From the formula (4), a point on the Bezier curve B(t) where $t = 0.5$ is located on a parallel line L(P, Q) which makes an interior division of 1:3 with respect to L(Z1, Z2) and L(A, E) when L(Z1, Z2) is parallel to L(A, E). In addition, the following formula (5) can be obtained from the formula (2).

$$\begin{aligned} B'(0.5) &= -3 \cdot A \cdot (1/4) + 3 \cdot Z1 \cdot (-1/4) + \\ & \quad 3 \cdot Z2 \cdot (1/4) + 3 \cdot E \cdot (1/4) \\ &= [(E - A) + (Z2 - Z1)](3/4) \end{aligned} \quad (5)$$

From the formula (5), it is seen that B'(0.5) is parallel to L(A, E). Accordingly, B(t) touches L(P, Q) when $t = 0.5$. The modified Bezier curve MB is defined as the Bezier curve B(t) which takes P and Q in place of Z1 and Z2. The following formula (6) shows a Bezier-to-modified Bezier conversion formula, and the following formula (7) shows a modified Bezier-to-Bezier conversion formula.

$$P = (3 \cdot Z1 + A)/4, \quad Q = (3 \cdot Z2 + E)/4 \quad (6)$$

$$Z1 = (4 \cdot P + A)/3, \quad Z2 = (4 \cdot Q - E)/3 \quad (7)$$

The modified Bezier curve MB can be described by the following formula (8) by substituting the formula (7) into the formula (1).

$$MB = A \cdot (1-t)^3 + (4 \cdot P - A) \cdot (1-t)^2 \cdot t + (4 \cdot Q - E) \cdot (1-t) \cdot t^2 + E \cdot t^3 \quad (8)$$

Figure 4B:
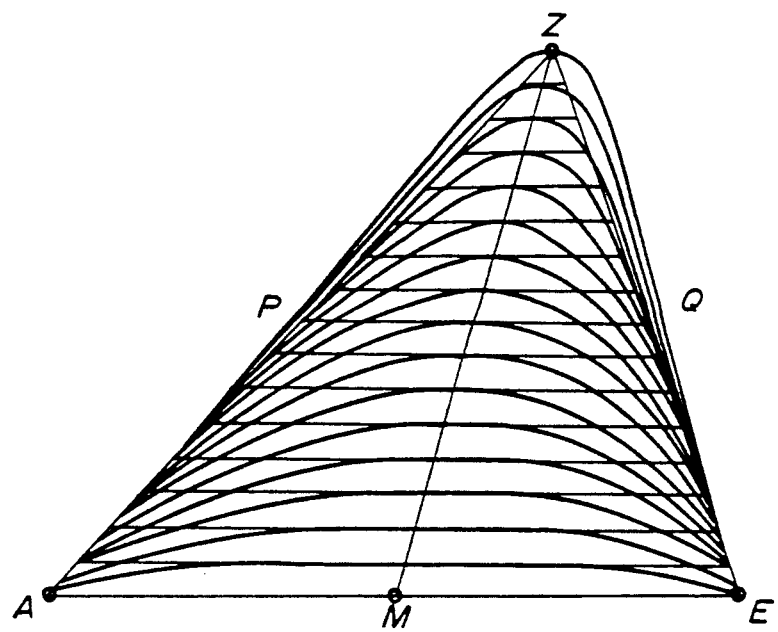
Figure 4C:
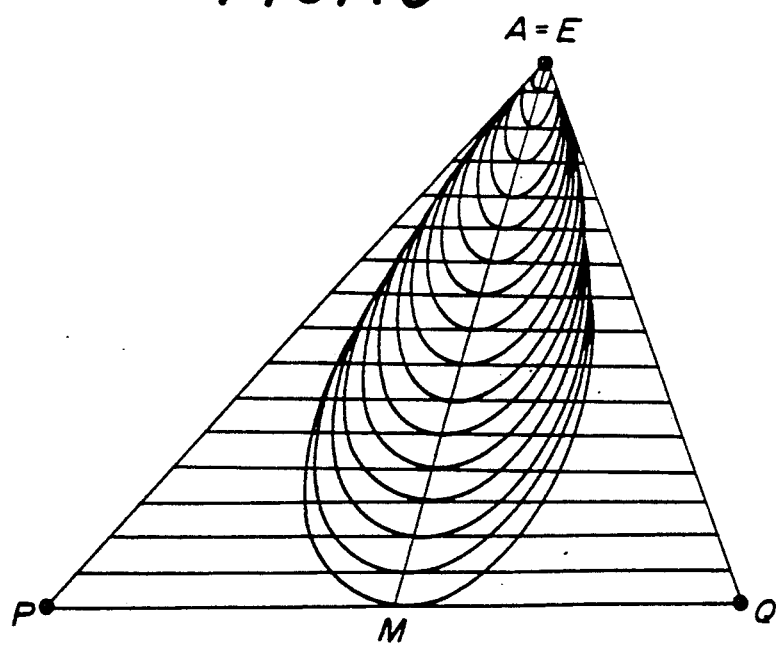

FIGS. 4B and 4C show examples of the modified Bezier curve MB. In FIGS. 4B and 4C, the modified Bezier curve MB touches L(P, Q) and touches L(A, P) and L(E, Q) at the control points A and E, thereby satisfying the requirements of the Bezier curve. Let P0, P1, P2 and P3 respectively be A, P, Q and Z hereafter.

When segmenting the contour of the original image into the plurality of curve or straight line segments, each of the segments can be described by the modified Bezier curve MB of the formula (9), where MB $= MB(x, y)$ denotes a generation point, $P0 = P0(x, y)$ denotes a starting control point where the segment starts, $P1 = P1(x, y)$ denotes a start direction control point which indicates a direction in which the segment starts, $P2 = P2(x, y)$ denotes an end direction control point which indicates a direction in which the segment ends, $P3 = P3(x, y)$ denotes an ending point where the segment ends, t denotes a parameter satisfying $0 \leq t \leq 1$, and c and d are arbitrary real numbers. MB, P0, P1, P2 and P3 are two-dimensional point vectors.

$$MB = P0(1-t)^3 + [cP1 - (c-3)P0][(1-t)^2 \cdot t + [dP2 - (d-3)P3][(1-t) \cdot t^2 + P3 t^3 \quad (9)$$

The starting and ending points P0 and P3 can be regarded as end control points which indicate ends of the segment. On the other hand, the start and end direction control points P1 and P2 can be regarded as direction control points which indicate directions of the segment at the two ends of the segment.

When automatically segmenting the contour of the original image into the plurality of curve or straight line segments using the modified Bezier curve as the generation curve, the ending point of one segment becomes the starting control point of a next segment. As a result, this it is equivalent to obtaining a plurality of starting control points (or end control points) P0 on the closed loop of the contour.

Figure 5:
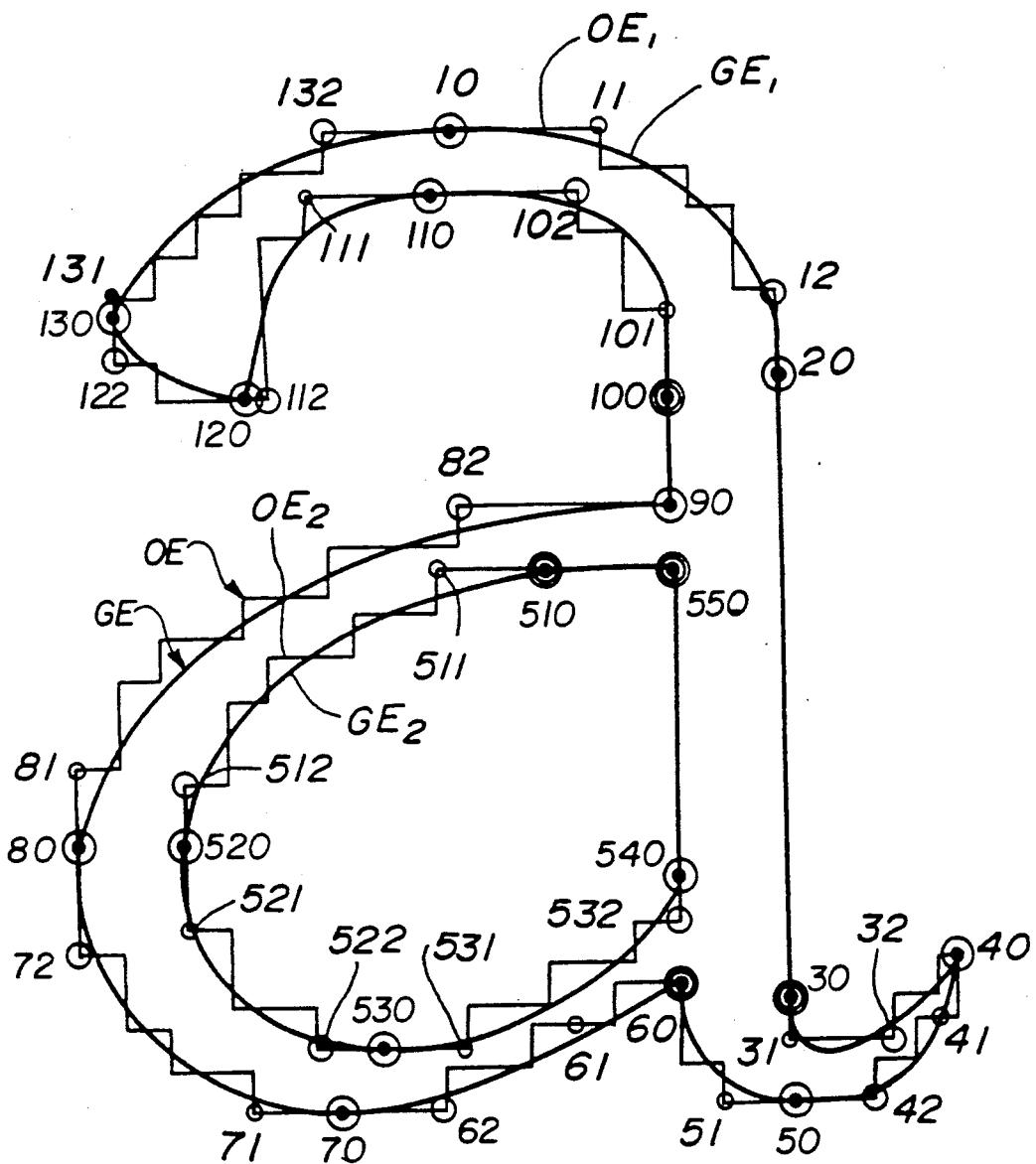
FIG. 5 is a diagram showing a relationship between an original contour of the character "a" and a generated contour.
Figure 9:
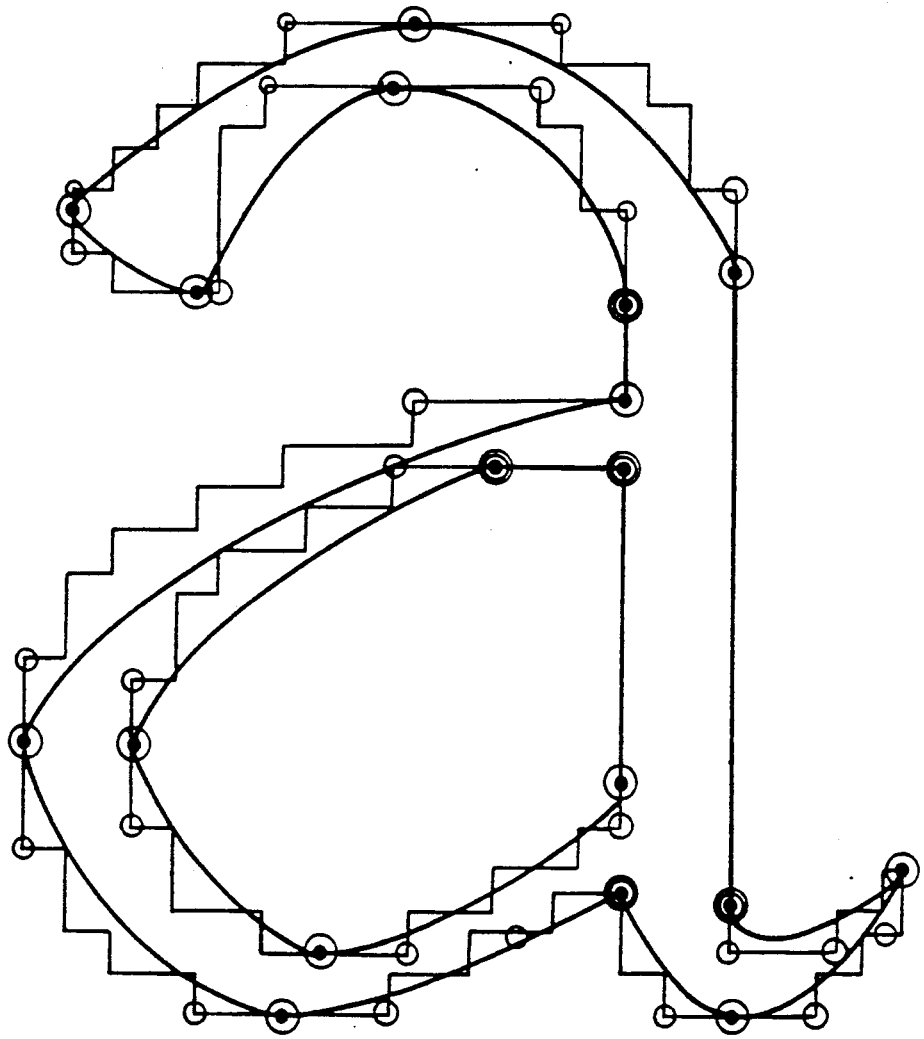
FIG. 9 is a diagram for explaining an inappropriate generated contour in correspondence with the original contour of the character "a"

For the sake of convenience, FIG. 5 shows an original contour OE of the original image which is a character "a" described by a 24×24 dot matrix. Also shown in FIG. 5 is a contour GE which is generated. A description will now be given of the method of obtaining the starting control points P0 with reference to FIG. 5. In FIG. 5 and FIG. 9 which will be described later, a small dot indicates the starting control point P0, a small circle indicates the start direction control point P1, a medium size circle indicates the end direction control point P2, and a large circle indicates the ending control point P3.

The original contour OE shown in FIG. 5 comprises two closed loops, that is, an outer contour loop OE1 and an inner contour loop OE2. First, the bit map memory 13 which stores the original contour OE is scanned from left to right in the main scanning direction and from the top to bottom in the sub scanning direction. When a point "132" is detected, the outer contour loop OE1 is traced clockwise and the tracing of the outer contour loop OE1 ends when the tracing returns to the point "132". While the outer contour loop OE1 is traced, the start address, the length and the direction of each segment on the outer contour loop OE1 are successively stored in the contour data memory 14 as trace data.

The microprocessor 12 analyzes the contents of the trace data memory 14 and sets P0 at a U-turn point (hereinafter simply referred to as a U-point) and end points T (hereinafter simply referred to as T-points) of a long segment. As shown in FIG. 6A, the U-turn point is a point where the direction changes by 180° in three consecutive segments change. On the other hand, as shown in FIG. 6B, the T-points are both ends of the long segment. For example, the long segment is defined as having a length which is at least ¼ the full length of the coordinate (dot matrix size) used. In the case of the image shown in FIG. 5, the point "10" is a U-point and the points "20" and "30" are T-points.

The automatic setting of the U-point is carried out as follows. For the sake of convenience, it is assumed that the U-point is determined on a segment L3 shown in FIG. 7. In FIG. 7, L1, L2, L3, L4 and L5 denote five consecutive segments, and the direction changes by 180° in the three consecutive segments L2, L3 and L4. Hence, the U-point is set on the segment L3. The U-point is set closer to L2 if L2>L4, and the U-point is set closer to L4 if L2<L4. When L2=L4, L1 and L5 are compared and the U-point is set closer to L5 if L1>L5 and set closer to L1 if L1<L5. When L2=L4 and L1=L5, the U-point is set at a middle point of L3. Although equal signs "=" are used to describe "L2=L4" and "L1=L5" above, the equal signs are used in a rough sense and means "approximately equal to".

The U-points are determined in the above described manner, and in FIG. 5, the nine points "10", "40", "50", "60", "70", "80", "110", "120" and "130" on the outer contour loop OE1 are U-points.

The automatic setting of the T-points are carried out as follows. In FIG. 8, the T-points are determined by long segments including the segments L1, L2, L3, L4 and L5. First, when L2=L4, a T-point T1 is a point moved forward by L1 from an intersection of L2 and L3, and a T-point T2 is a point moved back by L5 from an intersection of L3 and L4. If L2 and L3 are both long, the T-point T1 is an intersection of L2 and L3.

The T-points are determined in the above described manner, and in FIG. 5, the four points "20", "30", "90" and "100" on the outer contour loop OE1 are T-points.

When all the data of the outer contour loop OE1 are traced, analyzed and stored, the outer contour loop OE1 is erased and the bit map memory 13 is scanned again to detect a point "511" on the inner contour loop OE2. Because the inner contour loop OE2 is traced, this time the tracing is made counterclockwise. The trace data of the inner contour loop OE2 is stored in the contour data memory 14.

In FIG. 5, the two points "520" and "530" are U-points and the three points "510", "540" and "550" are T-points.

When the tracing and analyzing of the inner contour loop OE2 ends, the inner contour loop OE2 is erased and the bit map memory 13 is scanned again. However, the tracing ends because no contour exists within the entire image region.

In the case shown in FIG. 5, a total of eleven U-points and seven T-points are automatically set, and the contour is automatically segmented into a total of eighteen segments.

Figure 10:
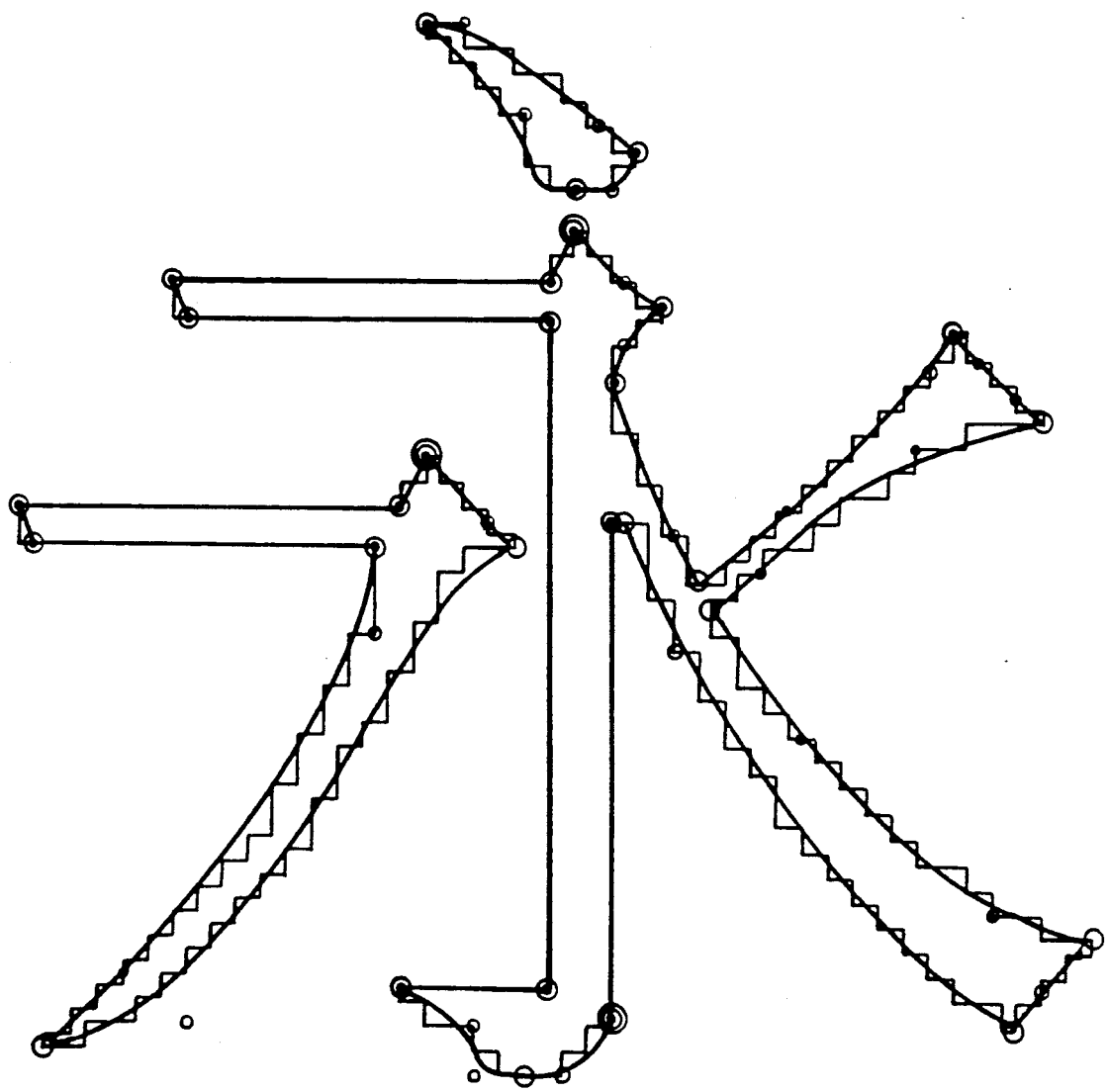
FIG. 10 is a diagram showing a relationship between an original contour of a kanji character and a generated contour for $c=d=5$.

The segment may not necessarily have a single peak and it is possible that the segment has two peaks such as the case of an approximate S-shaped curve. FIG. 10 shows the modified Bezier curve fitting of a kanji character (24×24 dot matrix) which includes approximate S-shaped curves for $c=d=5$. The control points at the approximate S-shaped curves are located outside the contour of the original image in FIG. 10. However, in this case, it can be found from calculations that the two peaks of each approximate S-shaped curve can be located on the contour if $c=d=6\sqrt{3}$.

A step S3 shown in FIG. 2 carries out a direction control point setting (setting of points P1 and P2). The U-point and T-point are starting control points P0 of the generation curves GE1 and GE2 shown in FIG. 5. Next, the direction control points P1 and P2 are set.

First, in the case where the middle point of L3 in FIG. 7 is a U-point, both ends of L3 are the direction control points P2 and P1. In FIG. 5, the thirteen points "11", "42", "51", "62", "71", "72", "81", "102", "111", "112", "122", "131" and "132" on the outer contour loop OE1 are such direction control points. On the other hand, when the T-point is set at an intermediate point on L3 in FIG. 8, both ends of L3 are the direction control points P1 and P2. In FIG. 5, the five points "12", "31", "82", "101" and "112" on the outer contour loop OE1 are such direction control points.

Furthermore, when the U-point is set at an intersection on L3 such as the case of the points "40" and "60" in FIG. 5, the direction control point P1 is set at a middle point of a (n/4)th segment when there exist n segments on the outer contour loop OE1 up to the next P0, because an acute angle is formed at the points "40" and "60". The points "41" and "61" are such direction control points P1. However, this method of setting the direction control point P1 is only applicable to the case where $c=d=5$ in the modified Bezier curve MB. When $c=d=3$ as in the case of the Bezier curve, P1 and P2 must be located at a position distant from the outer contour loop OE1. If the setting $c=d=3$ were made when P1 and P2 are on the outer contour loop OE1, the setting would be inappropriate as shown in FIG. 9 and it is seen that there is a need to convert P1 and P2.

The advantage of the modified Bezier curve MB is that virtually all of the control points can be set on the original contour by a local judgement by appropriately setting the values of c and d (for example, $c=d=5$). Since the control points can be determined from the local judgement, the process is simple and the process can be carried out at a high speed.

A step S4 in FIG. 2 carries out a control point coding. The coding of the control point address is made in the tracing sequence, that is, in the sequence of P0, P1, P2, P0, P1, P2, ... In FIG. 5 in which the character "a" is described by the 24×24 dot matrix, one control point can be represented in five bits for each of X and Y coordinates, that is, a coordinate code having a total of ten bits represents the character "a". Since there are eighteen starting control points P0 in FIG. 5, there are fifty-four (18×3=54) control points in total when overlapping direction control points P1 and P2 are included. Accordingly, the total code quantity of the control point address code is 540 (54×10) bits. The total code quantity is the same for the character "a" which is described by the 32×32 dot matrix. Hence, a coding efficiency CE for the 32×32 dot matrix is approximately equal to two because $CE=32\times32/540=1.9$.

Next, a description will be given of the address coding with mode code. As may be seen from the control points shown in FIG. 5, there are three important items to be considered.

1) First, the direction control points P1 and P2 in many cases overlap the starting control point P0.

2) Second, the address in many cases only undergoes a change in one of X and Y coordinates.

3) Third, an address difference between two control points in many cases is ¼ the maximum address or less.

By utilizing the above described features 1) through 3), the address coding with the following mode code is made, where 00, 01, 10 and 11 are mode codes, and X and Y respectively are an X address code and a Y address code. The starting control point of the loop is described by only XY.
00:Overlapping point
01X:A change in only X coordinate
10Y:A change in only Y coordinate
11XY:Changes in both X and Y coordinates In the case shown in FIG. 5, there are 20 (=10×2) starting control points of the loop, 84 (=2 ×42) mode codes, 130 (=5×26) control points whose address undergoes a change in only one of X and Y coordinates, and 160 (=10×16) control points whose address undergoes a change in both the X and Y coordinates. Hence, the total code quantity is 394 bits which is approximately 73% that of the address coding without the mode code. The coding efficiency CE for the 32×32 dot matrix is CE=32×32/394=2.6 which is improved by approximately 40% when compared to the address coding without the mode code.

Next, a description will be given of the difference coding with mode code. The above described address coding with mode code does not use a difference of X and Y addresses, however, it is possible to use an address difference. A sign bit s indicates the positive or negative sign of the address difference. Since the address difference is in most cases ¼ or less, three bits bbb are assigned to the address difference. When the address difference exceeds ¼, bbb is set to bbb=000 and a 5-bit difference code bbbbb is added next to the address difference 000. The following Table 1 shows the cases where a difference overflow does not occur and the cases where a difference overflow occurs.

TABLE 1

| No Overflow | Overflow |
|---|---|
| 00 | 00 |
| 01sbbb | 01s000bbbbb |
| 10sbbb | 10s000bbbbb |
| 11sbbbsbbb | 11s000bbbbbs000bbbbb |

When this difference coding is applied to the case shown in FIG. 5, the difference overflow in one of X and Y coordinates occurs between the points "20" and "30" and between the points "540" and "500". The difference overflow in both X and Y coordinates occurs between the points "81" and "82" and between the points "511" and "512". Accordingly, there are 20 (=10×2) starting control points of the loop, 84 (=2×42) mode codes, 96 (=2×48) address differences in one of X and Y coordinates, 18 (=9×2) difference overflows in one of X and Y coordinates, 112 (=8×12) address differences in both X and Y coordinates, and 36 (=18×2) difference overflows in both X and Y coordinates. Therefore, the total code quantity is 366 bits which is approximately 68% that of the address coding without the mode code. The coding efficiency CE for the 32×32 dot matrix is CE=32×32/366=2.8, and this corresponds to the address coding without the mode code for 36.6 control points. This value 36.6 is called a number of effective control points for the image shown in FIG. 5.

Next, a description will be given of the relationship between the coding efficiency and the dot matrix size. When the coding efficiency for a D×D dot matrix is considered, the coding efficiency CE can be described by the following formula (10), where N denotes the number of effective (or significant) control points and is constant regardless of the image size (dot matrix size). N=36.6 in the case shown in FIG. 5.

$$CE = D \cdot D / 2N \log_2 D \quad (10)$$

The 24×24 dot matrix is a standard size employed in a 6 dots/mm printer. The 32×32 dot matrix is a standard size employed in a 8 dots/mm printer. The 64×64 dot matrix is a standard size employed by a 16 dots/mm printer. The following Table 2 shows the relationships of the standard size, the resolution and the coding efficiency in comparison with the modified READ coding. As may be seen from the Table 2, the coding using the modified Bezier curve of the present invention and the modified READ coding have approximately the same coding efficiency for the 32×32 dot matrix with the 8 dots/mm printer However, as the standard size increases or the resolution increases, the coding efficiency of the coding using the modified Bezier curve improves notably when compared to that of the modified READ coding. In the Table 2, "MR Eff." indicates the coding efficiency of the modified READ coding, and "MB Eff." indicates the coding efficiency of the coding using the modified Bezier curve. In addition, the coding efficiency is calculated from (D×D)/(coding quantity of a), and k=∞ without EOL for the modified READ coding.

TABLE 2

| Standard Size | Resolution | MR Eff. | MB Eff. |
|---|---|---|---|
| 32 × 32 | 8 × 8 | 2.7 | 2.8 |
| 64 × 64 | 16 × 16 | 5.0 | 9.3 |
| 128 × 128 | 32 × 32 | 9.5 | 32.0 |
| 256 × 256 | 64 × 64 | 18.1 | 111.9 |
| 512 × 512 | 128 × 128 | 35.3 | 397.9 |
| 1024 × 1024 | 256 × 256 | 68.8 | 1432.5 |

Figure 11:
FIG. 11 is a diagram showing examples of characters which are generated by the image coding method according to the present invention employing an affine transformation.

FIG. 11 shows a Kanji character and the character "a" which are subjected to an affine transformation such as enlarging, reducing and rotating processes by use of the coding using the modified Bezier curve of the present invention with respect to the dot matrix size of 48×48 dots. In other words, FIG. 11 shows character fonts which are obtained by carrying out the curve fitting on the contour of the character fonts using the modified Bezier curve.

After the automatic curve fitting or after the automatic raster to vector conversion, an affine transformed point vector T can be obtained from a fitted control point vector P, where a slant factor S, a magnitude factor M, a rotation factor R, an affine factor F and a location factor X are respectively defined by the formulas (12) through (16).

$$T = (R \cdot M \cdot S) \cdot P + X \quad (11)$$
$$= (F) \cdot P + X$$

-continued $$S = \begin{bmatrix} 1 & sf \\ 0 & 1 \end{bmatrix} \quad (12)$$

$$M = \begin{bmatrix} mx & 0 \\ 0 & my \end{bmatrix} \quad (13)$$

$$R = \begin{bmatrix} cn & -sn \\ sn & cn \end{bmatrix} \quad (14)$$

$$F = \begin{bmatrix} f1 & f2 \\ f3 & f4 \end{bmatrix} \quad (15)$$

$$X = \begin{bmatrix} x_0 \\ y_0 \end{bmatrix} \quad (16)$$

In the above formulas (12) through (16), sf=cosα, α denotes an angle of X and Y axes, mx=scale x, my=-scale y, cn=cosθ, θ denotes a rotation angle, sn=sinθ, f1=cn·mx, f2=sn·mx·sf-sn·my, f3=sn·mx, f4=sn·mx·sf+cn·my, x₀=x location, and y₀=y location.

Further, the present invention is not limited to these embodiments, but various variations and modifications may be made without departing from the scope of the present invention.

What is claimed is:

1. An image coding method comprising the steps of:
 a) extracting an original vertical-horizontal contour of a bi-level image;
 b) segmenting the contour into a plurality of segments by fitting a predetermined generation curve on each of the segments, said predetermined generation curve being described by control points which include;
  1) end control points indicating ends of each segment; and
  2) direction control points indicating directions of the fitted curve of each segment at the two ends of each segment; wherein the predetermined generation curve is described by a polynomial MB, in which:

$$MB = P0 (1 - t)^3 + [cP1 - (c - 3)P0](1 - t)^2 \cdot t +$$
$$[dP2 - (d - 3)P3](1 - t) \cdot t^2 + P3 \cdot t^3$$

wherein:
 1) MB denotes a generation point;
 2) P0 denotes a starting end control point which indicates a start point of each segment;
 3) P1 denotes a start direction control point which indicates a direction of each segment at the start point;
 4) P2 denotes an end direction control point which indicates a direction of each segment at an end point of each segment;
 5) P3 denotes an ending control point which indicates the end point of each segment;
 6) t is a parameter, 0≤t≤1.0; and
 7) c and d are arbitrary real numbers;
wherein an ending control point of a first one of first and second consecutive segments is identical to a starting control point of the second consecutive segment; and
wherein the segmenting step includes assigning X and Y coordinates to an address of each of said control points; and
 c) coding the control points in a sequence of P0, P1, and P2 with respect to one contour, wherein the coding step includes adding a mode code, said mode code having:
  a first value for indicating an overlap of two control points,
  a second value for indicating an address change in only the X coordinate,
  a third value for indicating an address change in only the Y coordinate, and
  a fourth value for indicating an address change in both the X and Y coordinates.

2. The image coding method as claimed in claim 1 wherein said step of coding the control points codes an address difference of the control points.

3. The image coding method as claimed in claim 2 wherein said mode code includes a code portion for indicating an overflow of the address difference.

4. An image coding method comprising the steps of:
 a) extracting an original vertical-horizontal contour of a bi-level image;
 b) segmenting the contour into a plurality of segments by fitting a predetermined generation curve on each of the segments, said predetermined generation curve being described by control points which include:
  1) end control points indicating ends of each segment; and
  2) direction control points indicating directions of the fitted curve of each segment at the two ends of each segment;
wherein the predetermined generation curve is described by a polynomial MB, in which:

$$MB = P0 (1 - t)^3 + [cP1 - (c - 3)P0](1 - t)^2 \cdot t +$$
$$[dP2 - (d - 3)P3](1 - t) \cdot t^2 + P3 \cdot t^3$$

wherein:
 1) MB denotes a generation point;
 2) P0 denotes a starting end control point which indicates a start point of each segment;
 3) P1 denotes a start direction control point which indicates a direction of each segment at the start point;
 4) P2 denotes an end direction control point which indicates a direction of each segment at an end point of each segment;
 5) P3 denotes an ending control point which indicates the end point of each segment;
 6) t is a parameter, 0≤t≤1.0; and
 7) c and d are arbitrary real numbers; and wherein an ending control point of a first one of first and second consecutive segments is identical to a starting control point of the second consecutive segment; and
wherein the segmenting step includes assigning X and Y coordinates to an address of each of said control points; and
 c) coding the control points, the coding step including coding an address difference of the control points in a sequence of the control points P0, P1 and P2 with respect to one contour, the coding further including adding a mode code, said mode code including a code portion for indicating an overflow of the address difference.

5. An image coding method comprising the steps of:
extracting a contour of a bi-level image;
segmenting the contour into a plurality of segments by fitting a predetermined generation curve on each of the segments, said predetermined generation curve being described by control points which include end control points indicating ends of each segment and direction control points indicating directions of each segment at the two ends of each segment; wherein said stp of segmenting the contour includes assigning X and Y coordinates to an address of each of said control points, and
coding the control points by adding a mode code, and said mode code having a first value for indicating an overlap of two control points, a second value for indicating an address change in only the X coordinate, a third value for indicating an address change in only the Y coordinate and a fourth value for indicating an address change in both the X and Y coordinates.

6. The image coding method of claim 5, wherein said coding step includes:
coding an address difference of the control points.

7. The image coding method of claim 6, wherein:
said mode code includes a code portion for indicating an overflow of the address difference.

8. An image coding method comprising the steps of:
extracting a contour of a bi-level image;
segmenting the contour into a plurality of segments by fitting a predetermined generation curve on each of the segments, said predetermined generation curve being described by control points which include end control points indicating ends of each segment, and direction control points indicating directions of each segment at the two ends of each segment; and
coding the control points by adding a mode code including a code portion for indicating an overflow of the address difference.

* * * * *